United States Patent
Hsu

(10) Patent No.: US 12,038,521 B2
(45) Date of Patent: Jul. 16, 2024

(54) LOCALIZATION OF VEHICLES USING BEACONS

(71) Applicant: Motional AD LLC, Boston, MA (US)

(72) Inventor: Yih-Jye Hsu, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 18/118,025

(22) Filed: Mar. 6, 2023

(65) Prior Publication Data

US 2023/0204706 A1 Jun. 29, 2023

Related U.S. Application Data

(63) Continuation of application No. 17/107,928, filed on Nov. 30, 2020, now Pat. No. 11,598,836.

(51) Int. Cl.
*G01S 5/00* (2006.01)
*G01S 5/02* (2010.01)
*G01S 19/11* (2010.01)

(52) U.S. Cl.
CPC .......... *G01S 5/0072* (2013.01); *G01S 5/0244* (2020.05); *G01S 19/11* (2013.01)

(58) Field of Classification Search
CPC ....... G01S 5/0072; G01S 5/0244; G01S 19/11
USPC .................................................... 342/357.48
See application file for complete search history.

(56) References Cited

U.S. PATENT DOCUMENTS

| 8,417,444 B2 * | 4/2013 | Smid .......................... G01S 5/14 701/467 |
| 9,806,831 B1 * | 10/2017 | Rockwell ............. H04B 17/373 |
| 11,598,836 B2 | 3/2023 | Hsu |
| 2014/0342754 A1 | 11/2014 | Liu et al. |
| 2016/0277196 A1 | 9/2016 | Jose et al. |

(Continued)

FOREIGN PATENT DOCUMENTS

| CN | 101048994 | 10/2007 |
| CN | 103108390 A * | 5/2013 |

(Continued)

OTHER PUBLICATIONS

[No Author Listed], "SAE: Surface Vehicle Recommended Practice, Taxonomy and Definitions for Terms Related to Driving Automation Systems for on-Road Motor Vehicles," SAE International, Sep. 30, 2016, 30 pages.

(Continued)

*Primary Examiner* — Harry K Liu
(74) *Attorney, Agent, or Firm* — Fish & Richardson P.C.

(57) ABSTRACT

Embodiments are disclosed for localization of vehicles using beacons. In an embodiment, a method comprises: determining, using at least one processor of a vehicle, that the vehicle has lost external signals (or is receiving degraded external signals) that are used for estimating a position of the vehicle; determining, using the at least one processor, a set of mobile beacons that are available to assist in estimating the position of the vehicle; receiving, using a communication device of the vehicle, broadcast signals from the set of mobile beacons, the broadcast signals including localization data for the set of mobile beacons; selecting, using the at least one processor, a subset of localization data from the set of mobile beacons for assisting in the position estimation of the vehicle; and estimating, using the at least one processor, the position of the vehicle using the subset of localization data.

20 Claims, 9 Drawing Sheets

(56) References Cited

U.S. PATENT DOCUMENTS

| | | |
|---|---|---|
| 2018/0011444 A1 | 1/2018 | Marmet |
| 2018/0114441 A1 | 4/2018 | Marmet et al. |
| 2018/0203130 A1 | 7/2018 | Neubecker et al. |
| 2019/0158618 A1 | 5/2019 | Touboul |
| 2020/0327811 A1 | 10/2020 | Smith et al. |
| 2021/0160712 A1* | 5/2021 | Tadayon .............. H04L 1/0003 |
| 2022/0099816 A1 | 3/2022 | Eber et al. |
| 2022/0171010 A1 | 6/2022 | Hsu |

FOREIGN PATENT DOCUMENTS

| | | |
|---|---|---|
| CN | 106332280 | 1/2017 |
| CN | 107835526 | 3/2018 |
| CN | 107942318 | 4/2018 |
| CN | 108333610 | 7/2018 |
| CN | 110782693 | 2/2020 |
| CN | 111123334 | 5/2020 |
| CN | 111510866 | 8/2020 |
| DE | 102018111408 | 11/2019 |
| EP | 3570061 | 11/2019 |
| WO | WO 2013/166090 | 11/2013 |
| WO | WO 2019/197036 | 10/2019 |

OTHER PUBLICATIONS

Dong et al., "Position estimation with moving beacons in wireless sensor networks," 2007 IEEE Wireless Communications and Networking Conference, Mar. 11, 2007, 2317-21.

* cited by examiner

LOCALIZATION OF VEHICLES USING BEACONS

CROSS-REFERENCE TO RELATED APPLICATION

This application is a continuation of and claims priority to U.S. patent application Ser. No. 17/107,928, filed Nov. 30, 2020, the entire contents of which are incorporated herein by reference.

FIELD OF THE INVENTION

This description relates generally to localization of autonomous vehicles, and in particular localization using beacons.

BACKGROUND

Autonomous vehicles use a suite of sensors and communication devices to update their localization states while navigating their environment from one destination to the next. Fixed terrestrial beacons, wireless networks (e.g., cell tower, Wi-Fi) and satellite-based navigation systems, provide localization data with the highest accuracy and lowest uncertainties for use in the determination of the localization states of an autonomous vehicle. However, vehicles travelling through areas denied line-of-sight (LOS) to a fixed beacon, cell towers, Wi-Fi routers or satellites (e.g., tunnels, dense urban environments) quickly lose position accuracy when using equations of motion for calculation of the localization state.

DETAILED DESCRIPTION

Figure 1:
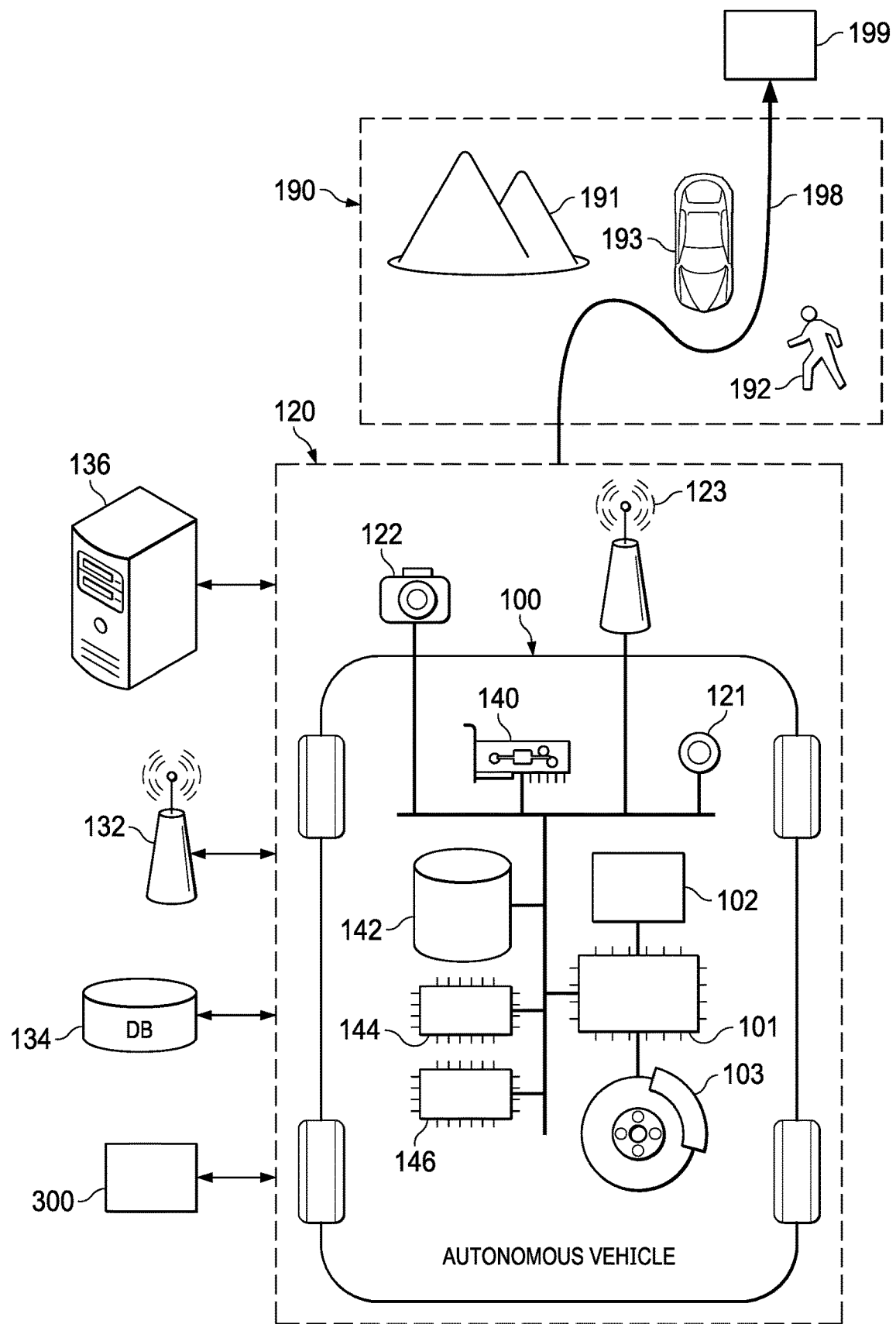
FIG. 1 illustrates an autonomous vehicle having autonomous capability, in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Communication With Mobile Beacons
5. Localizing With Received Localization Data
6. Fleet Services General Overview A vehicle (such as an autonomous vehicle) can have multiple sensors capable of sending and receiving information about its surroundings. For example, frequency-modulated continuous-wave RADAR is a short-range measuring sensor set capable of determining distance. The RADAR can periodically pause frequency sweeping and employ phase-shifted keying to encode and transmit localization estimation data, acting as a beacon for nearby vehicles. On the receiving end, an omnidirectional receiver listening on the same band as the RADAR can be used to pick up the beacon signal and use it to enhance its localization estimation.

In an embodiment, when a vehicle predicts (e.g., based on its current location and a map) that it may lose its current positioning technology (e.g., GNSS, Wi-Fi_33, Cell tower) in the near future due to its current location (e.g., entering a tunnel or dense urban environment), the vehicle can scan using its sensor for other vehicles that can operate as fixed or mobile beacons. These other vehicles presumably broadcast their estimated localization data, which can be used by the vehicle for localization using, e.g., trilateration based on distances to fixed beacons or another algorithm for localizing using moving beacons.

In an embodiment, a central computer for fleet operations can provide assistance by finding available fleet vehicles that can operate as fixed (e.g., parked vehicles) or mobile beacons. In an embodiment, the central computer can configure parked or out of service vehicles in the fleet to configure their GNSS receivers to act as terrestrial pseudolites that send, for example, GNSS RF signals that can be received directly by the vehicle's GNSS receiver.

In an embodiment where more than 4 beacons are available or a mix of fixed and mobile beacons, the receiving vehicle determines which combination of mobile/fixed beacons to use in its localization.

In an embodiment, estimated localization data from mobile beacons that have high position uncertainty can be excluded outright from localization processing. In an embodiment, dilution of precision (DOP) metrics or other metrics are computed for all possible combinations of 3 and 4 beacons to determine which mobile beacon combination will provide the most accurate position estimate based on their locations (e.g., more spread out geometry provides more accuracy).

In an embodiment, a method comprises: determining, using at least one processor of a vehicle, that the vehicle has lost external signals that are used for estimating a position of the vehicle; determining, using the at least one processor, a set of mobile beacons that are available to assist in estimating the position of the vehicle; receiving, using a communication device of the vehicle, broadcast signals from the set of mobile beacons, the broadcast signals including localization data for the set of mobile beacons; selecting, using the at least one processor, a subset of localization data from the set of mobile beacons for assisting in the position estimation of the vehicle; and estimating, using the at least one processor, the position of the vehicle using the subset of localization data.

In an embodiment, the localization data include estimated locations of the set of mobile beacons and uncertainty values associated with the estimated locations, and the subset of mobile beacons are selected based at least in part on the uncertainty values.

In an embodiment, selecting the subset of localization from the set of mobile beacons, further comprises: computing dilution of precision (DOP) values for combinations of mobile beacons in the set of mobile beacons; and selecting, using the at least one processor, the subset of mobile beacons from the set of mobile beacons based at least in part on the DOP values.

In an embodiment, the external signals include at least one of satellite signals wireless network signals or cellular network signals.

In an embodiment, the mobile beacons include other vehicles configured to transmit the broadcast signals.

In an embodiment, determining the set of mobile beacons, further comprises: sending, to a network computer a current position of the vehicle; and receiving, from the network computer, the set of mobile beacons.

In an embodiment, the localization data includes timestamps, and selecting the subset of mobile beacons further comprises: excluding from the subset of mobile beacons any mobile beacons that have a timestamp that exceeds a threshold value.

In an embodiment, the mobile beacons in the set of beacons are configured to operate as pseudolites, and the broadcast signals include localization data (e.g., pseudoranges) for the subset of mobile beacons that can be processed by, for example, a GNSS receiver, i.e., GNSS-assisted navigation.

In an embodiment, the method further comprises: determining, using the at least one processor, a set of stationary beacons that are available to assist in estimating the position of the vehicle; selecting, using the one or more processors, a mixed subset of mobile beacons and stationary beacons; receiving, using the communication device of the vehicle, broadcast signals from the mixed subset of beacons, the broadcast signals including localization data for the mixed subset of beacons; and estimating, using the at least one processor, the position of the vehicle using the localization data for the mixed subset of beacons.

In an embodiment, a method comprises: determining, at a first location and using at least one processor of a vehicle, that the vehicle operating at the first location may lose external signals (or received degraded external signals), where the external signals are used for estimating the position of the vehicle at the first location; determining, using the at least one processor, a set of mobile beacons at a second location that are available to assist in estimating the position of the vehicle at the second location; at the second location: receiving, using a communication device the vehicle, broadcast signals from the set of mobile beacons, the broadcast signals including localization data of the mobile beacons; selecting, using the at least one processor, a subset of the localization data from the set of mobile beacons; and estimating, using the at least one processor, the position of the vehicle at the second location using the subset of localization data.

In an embodiment, determining that the vehicle operating at the first location may lose external signals at the second location, further comprises: determining, using the at least one processor, that the vehicle will arrive at the second location at a future time based on a map and route of the vehicle; and determining, using the at least one processor and based on the map and route of the vehicle, that line-of-sights from transmitters of the external signals to the vehicle at the second location may be at least partially obstructed.

In an embodiment, the map includes a three-dimensional building model.

In an embodiment, a method comprises: determining, using the at least one processor, a set of stationary beacons at the second location that are available to assist in estimating the position of the vehicle at the second location; electing, using the at least one processor, a mixed subset of mobile beacons and stationary beacons for assisting in estimating the position of the vehicle; at the second location: receiving, using the communication device, broadcast signals from the mixed subset of beacons, the broadcast signals including localization data for the mixed subset of beacons; and estimating, using the at least one processor, the vehicle at the second location using the localization data for the mixed subset of beacons.

Some of the advantages of these techniques include pre-emptively identifying available mobile/fixed beacons when the current positioning technology (e.g., GNSS, WIFI, cell tower) is predicted to be lost, thus allowing a vehicle to get accurate position fixes without resorting to inaccurate dead reckoning navigation based on inertial sensors and equations of motion. Additionally, nearby vehicles can be used as mobile 'pseudolite' beacons to decrease localization estimation errors in GNSS-denied areas and without the latency/overhead of decoding data packets from broadcasts.

Current solutions such as stationary beacons incur issues such as the cost of installation, powering, and maintenance which vehicle beacons would eliminate. However, the system can evaluate both stationary and mobile beacons to determine the best combination for the most accurate position estimate. Further, if the receiving vehicle exists within an established fleet of vehicles connected to the same centralized reporting server, the server can aid in identification of nearby vehicles for use in localization estimation. One or more fleet vehicles operating in continuous broadcast mode would be able to act as localization waypoints for any nearby vehicles, whether participating in the fleet or not.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

The term "over-the-air (OTA) client" includes any AV, or any electronic device (e.g., computer, controller, IoT device, electronic control unit (ECU)) that is embedded in, coupled to, or in communication with an AV.

The term "over-the-air (OTA) update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., Wi-Fi) and/or satellite Internet.

The term "edge node" means one or more edge devices coupled to a network that provide a portal for communication with AVs and can communicate with other edge nodes and a cloud based computing platform, for scheduling and delivering OTA updates to OTA clients.

The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 200 described below with respect to FIG. 2.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Autonomous vehicles have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. We use the term "operational command" to mean an executable instruction (or set of instructions) that causes a vehicle to perform an action (e.g., a driving maneuver). Operational commands can, without limitation, including instructions for a vehicle to start moving forward, stop moving forward, start moving backward, stop moving backward, accelerate, decelerate, perform a left turn, and perform a right turn. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

In an embodiment, the AV system 120 receives and enforces a privacy level of a passenger, e.g., specified by the passenger or stored in a profile associated with the passenger. The privacy level of the passenger determines how particular information associated with the passenger (e.g., passenger comfort data, biometric data, etc.) is permitted to be used, stored in the passenger profile, and/or stored on the cloud server 136 and associated with the passenger profile. In an embodiment, the privacy level specifies particular information associated with a passenger that is deleted once the ride is completed. In an embodiment, the privacy level specifies particular information associated with a passenger and identifies one or more entities that are authorized to access the information. Examples of specified entities that are authorized to access information can include other AVs, third party AV systems, or any entity that could potentially access the information.

A privacy level of a passenger can be specified at one or more levels of granularity. In an embodiment, a privacy level identifies specific information to be stored or shared. In an embodiment, the privacy level applies to all the information associated with the passenger such that the passenger can specify that none of her personal information is stored or shared. Specification of the entities that are permitted to access particular information can also be specified at various levels of granularity. Various sets of entities that are permitted to access particular information can include, for example, other AVs, cloud servers 136, specific third party AV systems, etc.

In an embodiment, the AV system 120 or the cloud server 136 determines if certain information associated with a passenger can be accessed by the AV 100 or another entity. For example, a third-party AV system that attempts to access passenger input related to a particular spatiotemporal location must obtain authorization, e.g., from the AV system 120 or the cloud server 136, to access the information associated with the passenger. For example, the AV system 120 uses the passenger's specified privacy level to determine whether the passenger input related to the spatiotemporal location can be presented to the third-party AV system, the AV 100, or to another AV. This enables the passenger's privacy level to specify which other entities are allowed to receive data about the passenger's actions or other data associated with the passenger.

Figure 2:
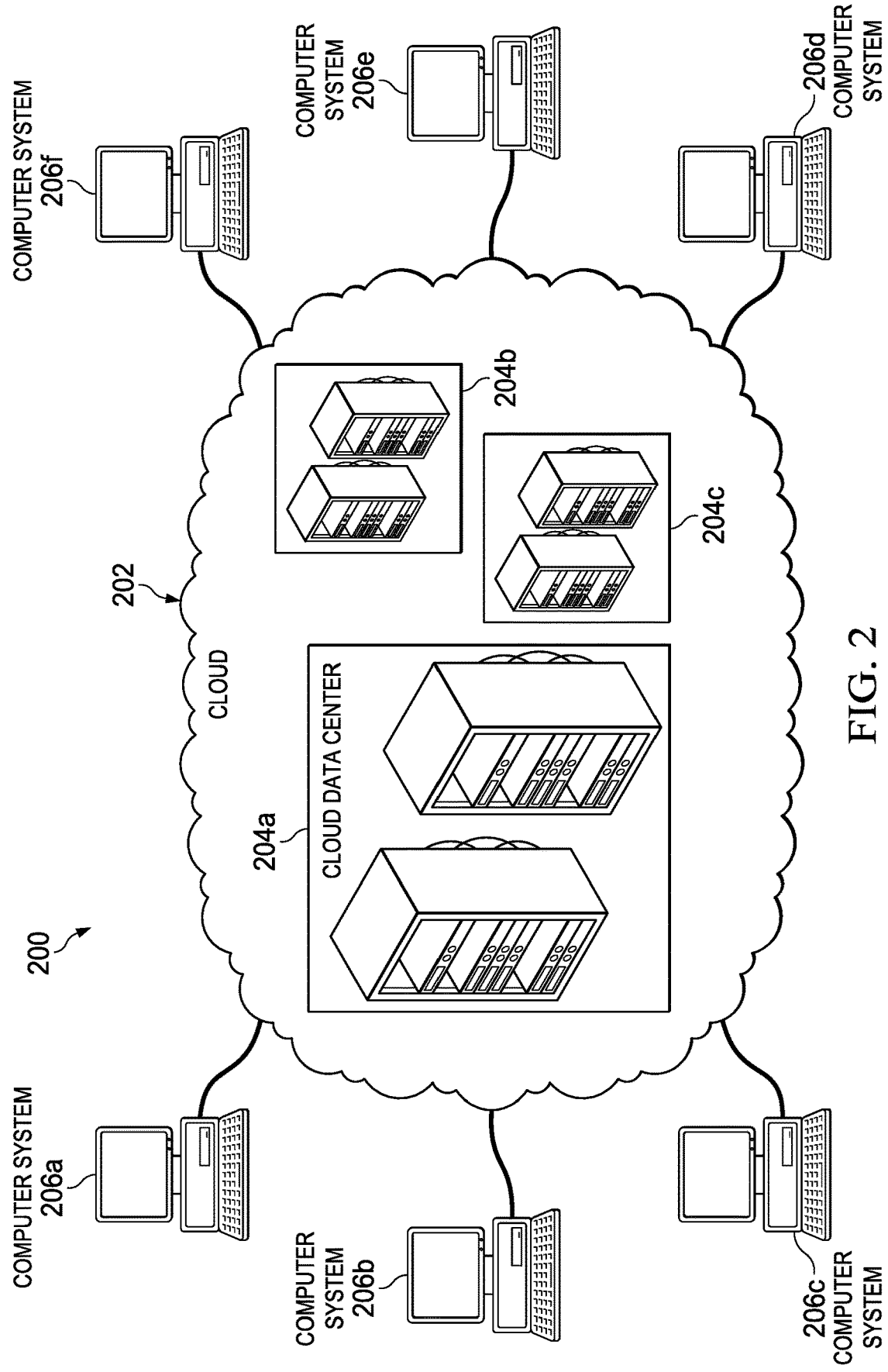
FIG. 2 illustrates a "cloud" computing environment, in accordance with one or more embodiments.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
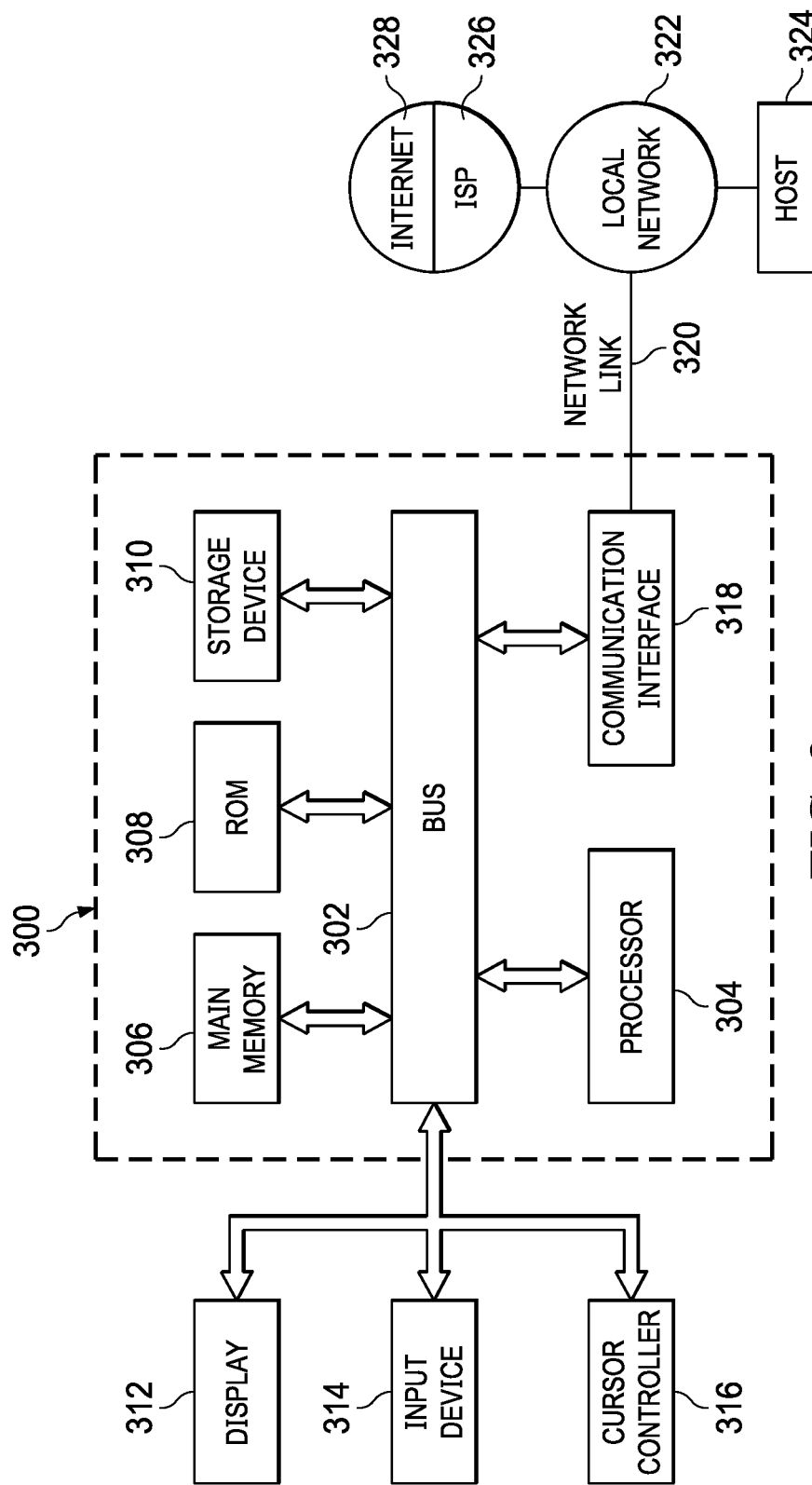
FIG. 3 illustrates an example computer system, in accordance with one or more embodiments.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
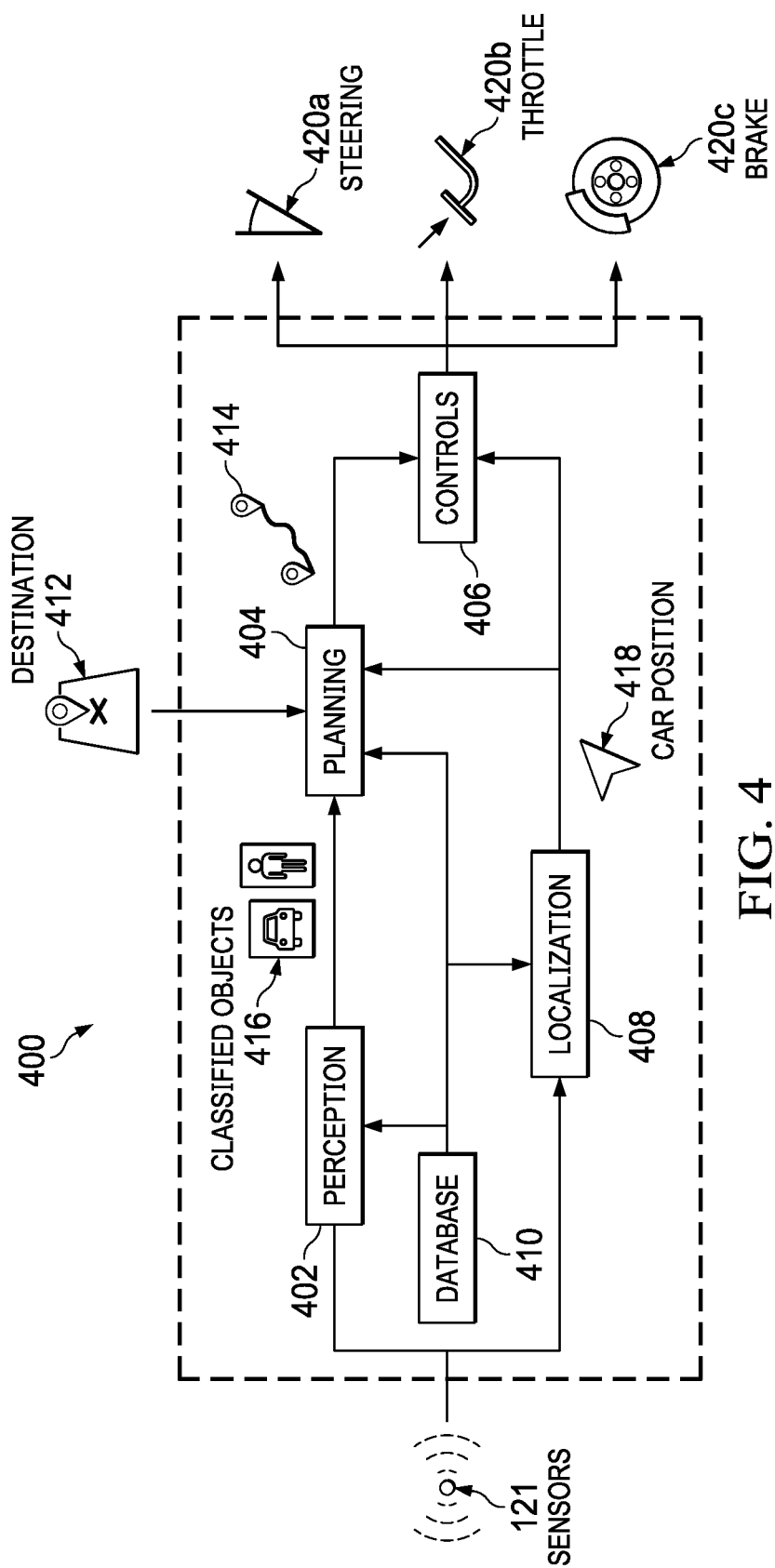
FIG. 4 illustrate an architecture for an autonomous vehicle, in accordance with one or more embodiments.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the modules 402, 404, 406, 408, and 410 is sometimes referred to as a processing circuit (e.g., computer hardware, computer software, or a combination of the two). A combination of any or all of the modules 402, 404, 406, 408, and 410 is also an example of a processing circuit.

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Communication with Mobile Beacons

Figure 5:
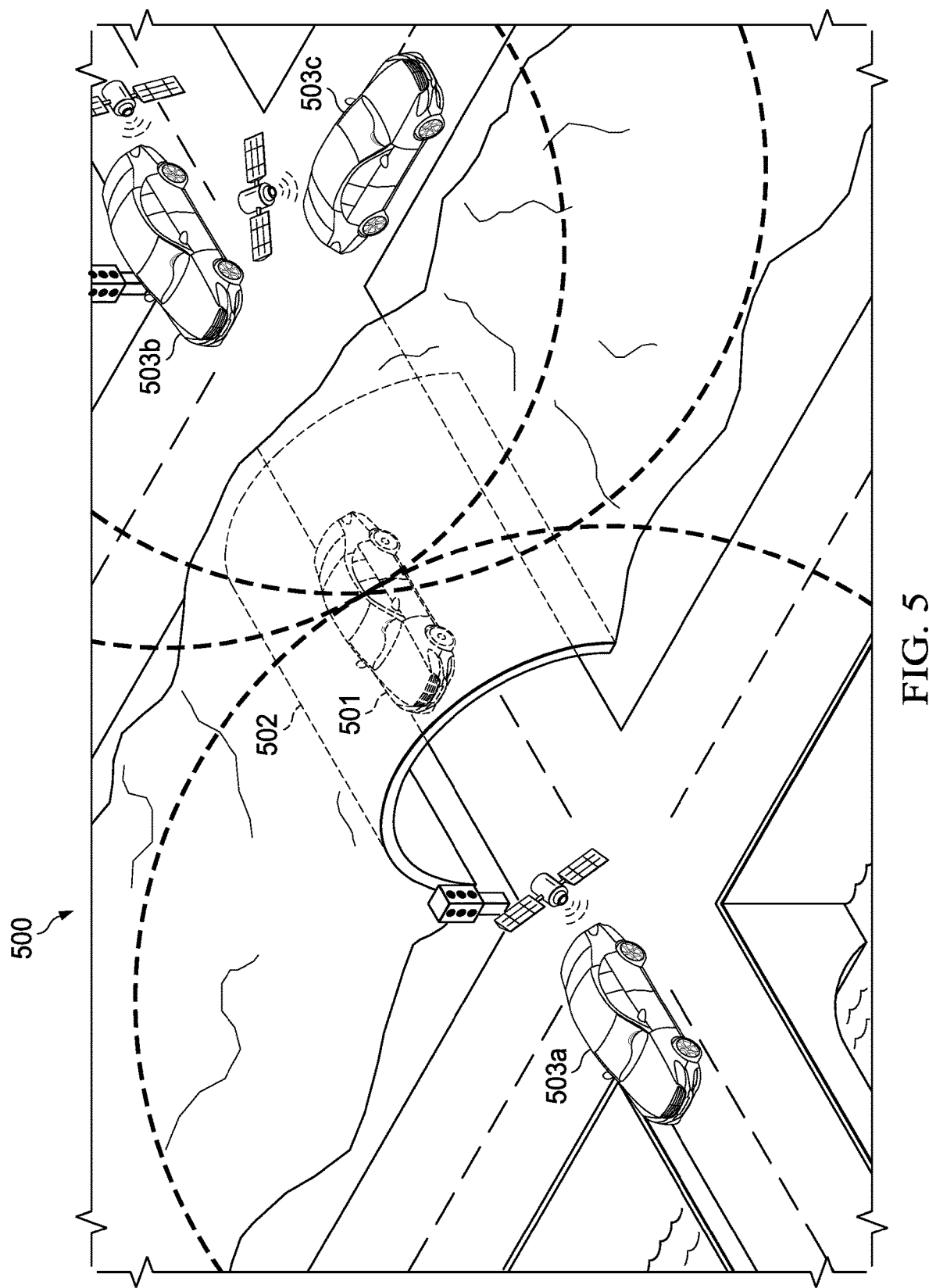
FIG. 5 illustrates an example scenario where beacons are used to localize an autonomous vehicle in a tunnel, in accordance with one or more embodiments.

FIG. 5 illustrates an example scenario 500 in which a number of autonomous vehicles (AVs) are navigating an environment. Each AV requires a number of highly accurate localization signals (e.g., GNSS satellite, Wi-Fi, cellular tower signals) for operation. These signals can be heavily degraded in areas lacking, LOS for a vehicle to receive the broadcasted localization information. FIG. 5 depicts a first example AV 501 in a GNSS-denied area 502, e.g., a tunnel, in which external signals (e.g., GNSS, Wi-Fi, cellular signals) used for localization have been lost or degraded. FIG. 5 further depicts three nearby AVs 503*a*, 503*b*, and 503*c* in areas in which localization signals remain available. The autonomous vehicles 501, 503*a*, 503*b*, or 503*c*, are examples of the AV 100 shown in FIG. 1.

AVs 501, 503*a*, 503*b*, or 503*c* store in the memory 306 of the computer system 300, localization data with which the localization module 408 determines a position, velocity and heading (i.e., direction) of the AV 501, 503*a*, 503*b*, or 503*c* receive supplemental localization data from sensors 121 and communication devices 140 to continually calculate their respective positions, velocities and headings from received localization data. The localization estimation includes an estimated position 418 and an associated uncertainty value for the estimated position or position error. As the AV 501, 503*a*, 503*b*, or 503*c* travels along the trajectory 414, the sensors 121 provide the localization module 418 new localization data and the localization module 418 uses the new localization data to update the estimated position 418 and its associated uncertainty value using, for example, an extended Kalman filter (EKF).

In FIG. 5, AV 501 is shown located within the GNSS-denied area 502 in which the sensors 121 are no long receiving external signals or are receiving degraded external signals. The sensors 121 and communication devices 140 no longer receive accurate localization data, either by complete loss of external signal or by receiving degraded external signals with increasing position error. As AV 501 continues along the trajectory 414 through area 502, the position error increases.

In the presence of degraded external signals, and/or absent any external signals, the localization module 408 estimates position 418 using equations of motion, e.g., kinematic equations, stored in the main memory 306 or storage device 310 of the AV 501. The equations of motion are kinematic equations used to propagate the estimated position 414 forward in time based on at least an estimated velocity and a change in time. The localization module 408 also propagates the errors associated with the estimated position and velocity, e.g., the position error and velocity error. In the absence of low-error external signals, however, the position error increases until an estimated position 418 can no longer be determined within an estimated position error threshold value.

The localization module 408 of the AV 501 in the GNSS-denied area 502 determines that the estimated position error is greater than the estimated position error threshold value and sends a command to the sensors 121 to begin searching for 'beacons' broadcasting their localization data within a range of the AV 501. In an embodiment, the GNSS-denied area is a 'dead zone' or an area with reduced or no availability of one or more communication network signals for example GNSS, Wi-Fi, cellular or other communication networks that are needed to localize AV 501. In an embodiment, the search can include both fixed and mobile beacons. A "mobile beacon" is any broadcast device capable of broadcasting its position including but not limited to other vehicles, airplanes, boats, etc. The communications interface 318 scans using at least one communications device 140 for broadcast signals containing localization data. For example, some mobile beacons may include frequency-modulated continuous-wave RADAR that is capable of determining distance. The RADAR can periodically pause frequency sweeping and employ phase-shifted keying to encode and transmit localization estimation data to AV 501, acting as a beacon for AV 501. On the receiving end, AV 501 can include an omnidirectional receiver listening on the same band as the RADAR can be used to pick up the beacon signal so that the signal can be used to enhance the localization estimation of AV 501. Other components can also be used to receive broadcast signals from fixed or mobile beacons, including but not limited to Radio Frequency (RF) wireless transceivers (e.g., Wi-Fi, Bluetooth).

In an embodiment, the planning module 404 determines that the trajectory 414 enters a GNSS-denied area 502. Prior to the AV 501 entering the area 502 the planning module 404 commands the communication interface 318 to scan for signals containing localization data to update the localization estimation. For example, at a first location planning module 404 can use a map and other means to determine that a route of the AV will enter a second location where external signals, such as GNSS, Wi-Fi and cellular network signals are not available, or are too degraded for using in a navigation solution as indicated by, for example, a low signal-to-noise (SNR) post demodulation or carrier-to-noise ratio (CNR) for the RF passband signal.

In an embodiment, the map includes a three-dimensional building model, which can be used to determine line-of-sight from particular external source signals (e.g., GNSS signals) to the vehicle at the second location. By determining the loss or degradation of external signals at a first location for a second location, the planning module 404 can preemptively determine a candidate list of fixed or mobile beacons at the second location that could potentially be used estimate the position of the AV at the second location when the externals signals are lost or degraded. In an embodiment, the planning module 404 can query a network based fleet management platform with the second location to search for and provide a list of available fixed or mobile beacons. The advantage of using a fleet management computer, is that all of the vehicles in the fleet are already being tracked and their locations are known from, for example, GNSS receivers on board the fleet vehicles. Also, the fleet management computer knows whether particular vehicles in the fleet are parked (e.g., fixed beacons) or have pseudolite capability for assisted GNSS operations. Also, because of the additional computational power, more complex search algorithms can be used by the fleet management computer.

Nearby AVs 503*a*-*c* are configured to operate as mobile beacons and periodically encode their localization data into their respective broadcast signals, which are transmitted using wireless communication or through other devices, such as RADAR as previously described. The localization module 408 provides localization data to the communication interface 318 which encodes the data into a signal. The signal is broadcast using a sensor 121 or communications device 140 on a broadcast frequency.

The localization data that is broadcast by mobile beacons can include position coordinates (e.g., latitude, longitude, altitude) of the beacon determined using GNSS satellites or any other positioning technology (e.g., Wi-Fi, cell tower) and/or range or distance information (e.g., if using RADAR). In an embodiment, the sensors 121 of the AV 501, 503a, 503b and 503c include a continuous-wave frequency-modulated (CWFM) radar device capable of determining distance. The CWFM radar device operates by transmitting a continuous wave of radio energy that varies in frequency over a fixed period of time by a modulating signal (e.g., sine wave, saw tooth wave, triangle wave, or square wave). The CWFM radar receives backscattered radio energy from any reflecting objects and uses the backscattered energy to generate a Doppler signal. The Doppler signal is the frequency difference between the received and transmitted signal increases with distance, e.g., delay between transmitted and received signals. Backscattered energy from the reflecting object convolves with the transmitted signal to produce a beat signal which will give the distance of the target after demodulation. In an embodiment, the beacon AVs 503a-c broadcast the signal containing localization data by modulating the signal emitted from the CWFM radar.

In an embodiment, the broadcasting AVs 503a-c can operate as a 'pseudolite' wherein the wireless transceivers of the communications interface 318 are repurposed to broadcast on the frequency range (e.g., between 1176 MHz to 1610 MHz) and using the data format (e.g., NMEA, or RINEX) of a GNSS transmitter. In this manner, the GNSS receiver of nearby AVs receive signals transmitted by the pseudolite AVs 503a-c as GNSS signals.

When the AVs 503a, 503b, and 503c are broadcasting their localization data through one or more sensor 121 or communication device 140, they operate as a 'mobile beacon' to assist localization of AV 501. Mobile beacons in motion (e.g., non-zero velocity) are called 'moving beacons' and mobile beacons that are stationary (e.g., zero velocity) are called 'fixed beacons'. The communication interfaces 318 of mobile beacon vehicles AVs 503a, 503b, or 503c encode localization data stored in the localization module 408 into a broadcast signal as described above. For example, localization data the communications interfaces 318 encodes includes a time stamp, a unique vehicle identification value, an estimated position and/or velocity, and associated uncertainties.

In an embodiment, the communication interfaces 318 uses one or more processors 304 to encode the localization data into the broadcast signal via, for example, phase-shift keying. Phase-shift keying is a digital modulation process which conveys data by modulating the phase of a constant frequency reference signal. Alternative modulation processes include frequency keying, amplitude keying, or pulse-code modulation. The communication interface 318 transmits the broadcast signal containing the encoded localization data. In an embodiment, the broadcasting AV uses a CWFM radar to transmit the broadcast signal on the same broadcast frequency using a transceiver of the radar.

Figure 6:
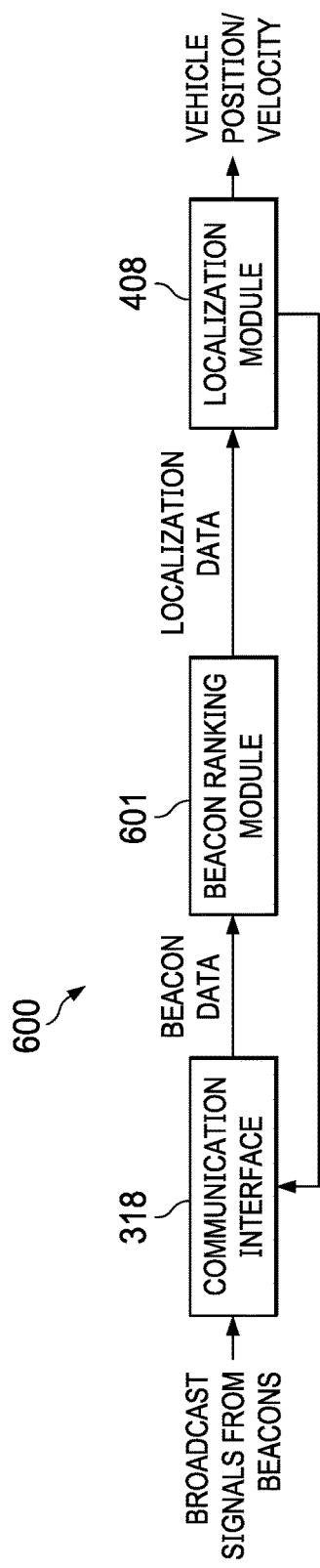
FIG. 6 illustrates a localization system, in accordance with or more embodiments.

FIG. 6 illustrates the localization system 600 with which AV 501 receives and filters the set of localization data from nearby broadcasting beacon AVs, both mobile and fixed, and updates its localization estimation within the localization module 408. The beacon data can include but is not limited to: a beacon identifier, estimated position and velocity coordinates, estimated uncertainty values associated with the position and velocity coordinates, the time elapsed since the last position fix (i.e., the age of the beacon data), the operating status and communication range of the beacon, pseudolite capability, operating bands, cryptographic data and any other information that can assist in localization of AV 501. As AV 501 scans broadcast frequencies using sensors 121 or communications devices 140, such as an omnidirectional receiver, the communications interface 318 receives and decodes, or demodulates, the signals containing localization data from one or more beacon AVs 503a-c. The communications interface 318 combines the localization data of one or more beacon AVs 503a-c and determines a set of localization data corresponding to a set of nearby beacon AVs 503a-c available to assist in localization of AV 501. The communications interface 318 sends the set to the localization module 408 to the beacon ranking module 601 for filtering and ranking.

Localizing with Received Localization Data

In an embodiment, the beacon ranking module 601 is a part of the AV system 120 that filters beacons acquired in the beacon scan localization data and ranks the beacons with respect to one or more quality factors (e.g., accuracy, precision, age of position fix). The beacon ranking module 601 selects a subset of the localization data available based on their relative quality factors for localization of AV 501, as described more fully in reference to FIG. 7.

Figure 7:
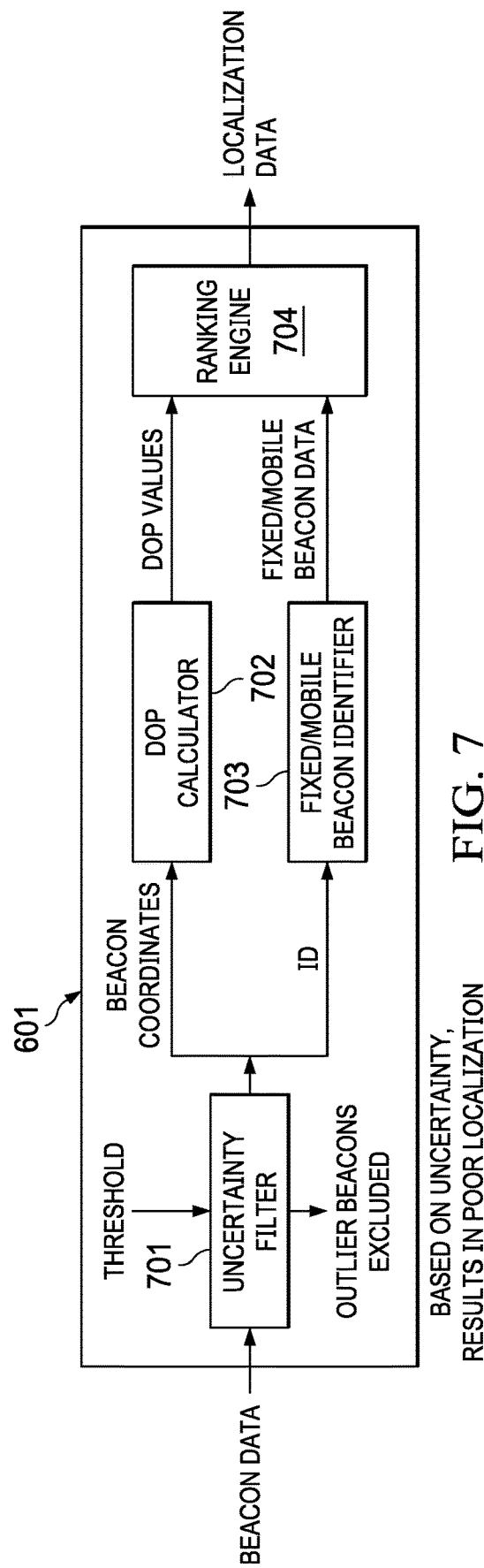
FIG. 7 illustrates beacon ranking, in accordance with one or more embodiments.

FIG. 7 illustrates further detail of the beacon ranking module 601 of the localization system 600. The beacon ranking module 601 receives the beacon data and selects a subset of localization data for estimation the position of the vehicle using localization module 408. In an embodiment, the subset of localization data is selected based on at least one criteria, including but not limited to: position error, dilution of precision (DOP), age of position fix (e.g., based on a timestamp in the beacon data), and data (e.g., a flag) indicating whether the beacon is fixed or mobile. The fixed/mobile beacon indicator can change for vehicle beacons depending on whether they are moving or parked.

In an embodiment, the beacon data provided to the beacon ranking module 601 is processed through an uncertainty filter 701 in which the position error of the provided set of localization data is assessed. In an embodiment, the uncertainty filter 701 compares the provided estimated position error to a position-error threshold value stored in memory, representative of a maximum position error for a mobile beacon to be allowed in the subset of mobile beacons to assist in localization of AV 501. Uncertainty filter 701 excludes from the set of available mobile beacons localization data including position error greater than the position-error threshold value. In this manner, the reduced set of available mobile beacons assisting AV 501 includes only localization data from mobile beacons within a defined accuracy limit.

In an embodiment, the uncertainty filter 701 excludes available beacons for additional criteria. For example, the uncertainty filter 701 excludes available beacons based on their timestamp of the position fix. The uncertainty filter 701 compares the timestamp included in the localization data of broadcast signals from nearby mobile beacons to the local timestamp maintained in memory 306 and computes a time difference between the local timestamp and the mobile beacon localization data timestamp. If the time difference is greater than a time-difference threshold value, the uncertainty filter 701 excludes the localization data from the set of available mobile beacons. For example, time differences greater than the threshold value of 5 minutes are excluded (e.g., greater than 5 mins, greater than 10 mins, greater than 15 mins). In this manner, localization data that is not current (e.g., stale position fix) is excluded from further comparison.

If the uncertainty filter 701 excludes all mobile beacons of the subset, the AV 501 continues along the trajectory 414 using equations of motion to update the localization estimation until external signals or additional sets of localization data can be received.

In an embodiment, after filtering the set of all available mobile beacons and removing beacons providing insufficient position errors or including time stamps that are above the time-difference threshold value, the uncertainty filter 701 provides the remaining list of beacons to two additional algorithms in the beacon ranking module 601: a DOP calculator 702 and a fixed/mobile beacon identifier 703. FIG. 7 depicts the DOP calculator 702 and fixed/mobile beacon identifier 703 as parallel operations but this is not necessary. In an embodiment, the DOP calculator 702 performs in series with the fixed/mobile beacon identifier 703.

Because mobile beacons are moving there may be significant position error in their estimated positions based on their speed a geometric dilution of precision (GDOP), hereinafter referred to as "DOP." For example, if the AV is too close or too far from the mobile beacons the GDOP becomes larger. In general, the more geometrically spread out the mobile beacons are from each other relative to the AV, the more accurate the position fix of the AV using the mobile beacons. The DOP calculator 702 of FIG. 7 is an algorithm that receives the localization data from the subset of mobile beacons and calculates DOP value for a number of different combinations of localization data within the subset. DOP values are used in satellite navigation and geomatics engineering to specify how the orientation and positional errors of a constellation of navigation satellites affect subsequent position estimations using the localization data provided by the satellites. DOP values additionally apply to the calculation of a position based on the position geometry and associated errors of a set of terrestrial beacons, such as the mobile beacons described herein.

GNSS devices of the communication interface 318 of an AV 501 calculates an estimated position from a set of one or more navigation satellites using "multilateration" algorithms. Multilateration is the process of determining a point at which more than one spheres intersect. For example, determining a point at which three spheres intersect is called 'trilateration'.

In the case of multilateration using GNSS satellites, each satellite defines a sphere centered on the position of the satellite with a radius of the calculated distance from the satellite to the GNSS receiver of the AV 501. The calculated distance includes an error term and the intersection of more than one sphere with distance uncertainties forms an area whose bounds are determined by the calculated distance error to each available navigation satellite. The real position of the GNSS receiver of the AV 501 could be located at any point in the area, forcing devices to choose from many possibilities. Precision is said to be "diluted" when the area grows larger, e.g., greater error associated with the calculated distances, or DOP.

DOP values are calculated and reported in three of values: horizontal, vertical, and mean DOP. Horizontal DOP (HDOP) measures DOP as it relates to latitude and longitude. Vertical DOP (VDOP) measures precision as it relates to altitude. Mean DOP, also known as Position DOP (PDOP), gives an overall rating of precision for latitude, longitude and altitude. Each DOP value is reported as a number between one and fifty where fifty represents very poor precision and one represents ideal accuracy.

The DOP calculator 702 of the beacon ranking module 601 receives the subset of mobile beacons and calculates a mean DOP value for every combination of two or more beacons in the subset. For example, the DOP calculator 702 calculates DOP values for each combination of two, three, or four beacons if the subset contains four or more positions relating to four mobile beacons assisting in the localization.

The DOP calculator 702 generates a DOP-value list (e.g., a table) including every combination of mobile beacons within the received set of available mobile beacons to assist in the localization of the AV 501 and the DOP value associated with each combination. In an embodiment, the DOP calculator 702 compares the DOP value of each combination of beacons to a DOP-threshold value stored in memory and excludes combinations associated with DOP values greater than the DOP-value threshold from the DOP-value list provided to the ranking engine 704.

The fixed/mobile beacon identifier 703 receives the subset of available beacons from the uncertainty filter 701. The fixed/mobile beacon identifier 703 then determines which beacons are stationary beacons (e.g., infrastructure, parked vehicles) and which beacons are mobile (e.g., vehicles). In an embodiment, the beacon identifier 703 determines which beacons are stationary by comparing the velocity value included in the received localization data to a stationary-velocity threshold value over a specified time period. If the velocity value is lower than the stationary-velocity threshold value, the beacon identifier 703 determines that the velocity value is associated with a stationary beacon. If the velocity value is higher than the stationary-velocity threshold value, the beacon identifier 703 determines that the velocity value is associated with a mobile beacon that is in motion.

In an embodiment, the localization data received from a beacon includes the fixed/mobile value for the associated beacon. For example, an infrastructure beacon that remains at a constant position can include a fixed/mobile value indicating that the beacon is stationary with the transmitted localization data.

Beacons in motion include higher position error in associated localization data due to a non-zero velocity. In an embodiment, the beacon identifier 703 compares the position error value of the received localization data from an available beacon to determine the fixed/mobile value. The beacon identifier 703 then associates a fixed/mobile value with the beacon localization data classifying the associated beacon as stationary or mobile and provides an identification list including all beacon localization data and associated fixed/mobile value to the ranking engine 704.

The ranking engine 704 receives the DOP-value list from the DOP calculator 702 and the identification list from the fixed/mobile beacon identifier 703. The ranking engine 704 then determines a ranked DOP-value list of combinations of beacons, ranking the included combinations from lowest DOP value (e.g., closest to one) to highest. In an embodiment, the ranking engine 704 determines ranked DOP-value lists using only beacons identified as mobile, using a hybrid combination of both mobile and fixed beacons identified as both mobile and fixed, and using only beacons identified as fixed. Referring again to FIG. 6, the ranking engine 704 then provides the determined subset of mobile beacons to the localization module 408 to be used to estimate or update an estimate of the position and velocity of the AV.

Figure 8:
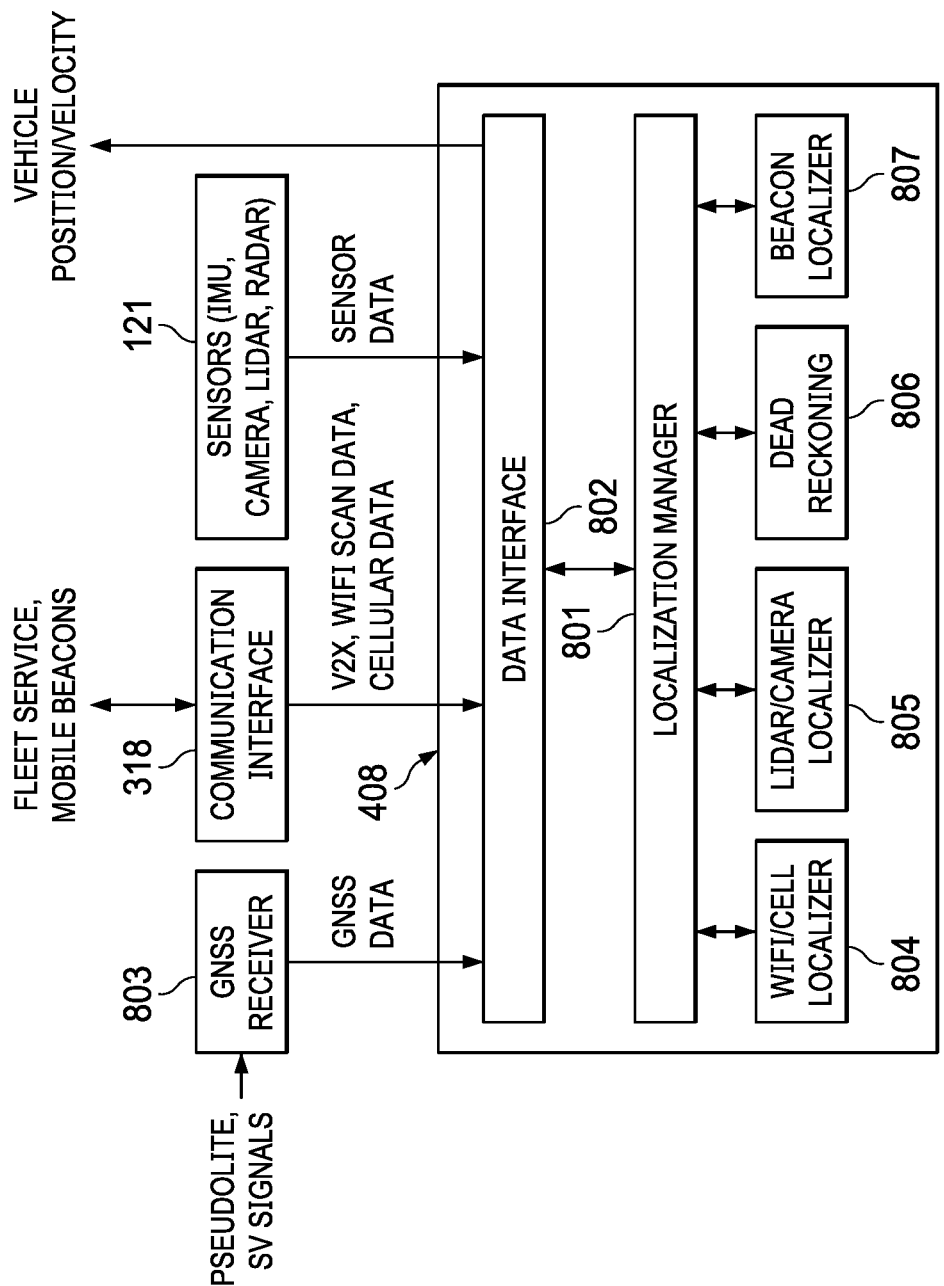
FIG. 8 illustrates a localization manager, in accordance with one or more embodiments.

FIG. 8 illustrates the localization manager 801 of the localization module 408 and how the localization module 408 interfaces with the GNSS receiver 803, communications interface 318, and sensors 121 of the AV 501 via electronic communication with data interface 802. Data interface 802 receives data from a number of services including the GNSS receiver 803, communications interface 318, and sensors 121 of the AV 501.

The GNSS receiver 803 is a hardware component that receives GNSS data from broadcasting GNSS satellites. For example, the GNSS receiver 803 receives GNSS data from a nearby pseudolite, satellite vehicle, infrastructure satellite, or a satellite in geostationary orbit. The communications interface 318 provides a two-way link to a number of external signals providing data communication. For example, the communications interface 318 is in electronic communication with a local network through which the interface 318 receives data from fleet services or other beacons. The communications interface 318 further provides data from a number of communication networks to the localization module, such as Wi-Fi scan data, cellular data, or vehicle-to-everything (V2X) data. The localization module 408 further receives sensor data from the onboard sensors 121 which includes one or more data streams from onboard camera, LiDAR, radar, or inertial measurement unit (IMU) systems.

Data interface 802 also provides localization estimations from associated localizers to requesting modules in AV 501. For example, the planning module 404 requests a localization estimation from the localization module 408. The request is communicated to data interface 802 and sent to the localization manager 801.

The localization module 408 includes one or more localizers to process received data. A localizer is software stored in memory of the localization module 408 and executed using one or more processors that calculates a localization estimation using the received data. The localization module 408 of FIG. 8 includes a wireless/cellular localizer 804 to process wireless/cellular data, a LiDAR/camera localizer 805 to process optical sensor data, a dead reckoning localizer 806 to calculate localization estimations in the absence of external signals, and a beacon localizer 807 to process beacon data.

The wireless/cellular localizer 804 is a localization estimation system that uses nearby wireless access points (e.g., Wi-Fi, or cellular network) to determine a localization estimation for the AV 501. In an embodiment, the AV 501 receives Wi-Fi, or cellular data from the data interface 802 and measures the intensity of the received signal (e.g., received signal strength indication, or RSSI). The wireless/cellular localizer 804 uses the RSSI to calculate a wireless signal "fingerprint".

Fingerprinting is a method in which the wireless/cellular localizer 804 receives and combines multiple RSSI values from nearby wireless access points into an RSSI vector. The wireless/cellular localizer 804 then receives the estimated position of the AV 501 from the localization module 408 and combines this with the RSSI vector to form a first fingerprint. After a time during which the AV 501 is traveling along the trajectory 414 and arrives at a second unknown location, the wireless/cellular localizer 804 determines a second RSSI vector at the second location and compares to the second vector to the first to calculate an estimated position at the second location.

The accuracy of the fingerprinting method depends on the number of nearby access points and their associated positions and distances from the AV 501. Fluctuations and interference in received wireless access point signals increase uncertainties in localization estimation.

In additional embodiments, the wireless/cellular localizer 804 calculates localization estimations based on one or more parameters including signal strength, angle of arrival, or time of flight parameters of received wireless signals. In a further example, the processes and features described in the publication of Position Estimation With Moving Beacons in Wireless Sensor Networks by Wong et al. (DOI: 10.1109/WCNC.2007.433), which is incorporated by reference in its entirety, can be used in the calculation of vehicle location estimations using mobile beacons.

The LiDAR/camera localizer 805 receives optical signal data from the data interface 802 including camera image data and LiDAR data. The LiDAR/camera localizer 805 then calculates a localization estimation using visual odometry, a method of calculating an estimated position and orientation of the AV 501 by analyzing sequential camera and/or LiDAR images. The visual odometry method uses sequential images from one or more cameras or LiDAR sensors received from the data interface 802 to extract 'feature points' from an image of the sequence. The LiDAR/camera localizer 805 tracks the change in position of the feature points through the image sequence to determine a localization estimation with the surrounding environment.

In an embodiment, the LiDAR/camera localizer 805 uses inertial measurement unit (IMU) data combined with the camera images to calculate a localization estimation using Visual Inertial Odometry (VIO).

The localization module 408 further includes a dead reckoning localizer 806 that calculates a localization estimation in the absence of external signals. The dead reckoning localizer 806 uses calculates the localization estimation of the AV 501 by using a previously determined estimated position and speed and projecting the location over an elapsed time. When the communication interface 318 or GNSS receiver 803 does not provide localization data to the localization module 408 of AV 501, the equations of motion used by dead reckoning localizer 806 is subject to cumulative errors based on at least the initial position error.

The localization manager 801 maintains in memory a list of available localization estimations provided by localizers 804, 805, 806, 807. In an embodiment, the localization manager 801 compares the position error of each localization estimation and ranks the estimations based on at least the position error.

The localization manager 801 provides to requesting modules, such as the planning module 404, one or more of the localization estimations stored in memory. A requesting module requests a localization estimation based on at least one parameter of a stored localization estimation. For example, the planning module 404 requests a localization estimation including the lowest position uncertainty to calculate a trajectory 414. The localization manager 801 compares the position uncertainty of the localization estimations from the localizers 804, 805, 806, 807 and provides the planning module 404 with the localization estimations including the lowest position uncertainty, such as the beacon localizer 807 estimation.

Fleet Services

Figure 9:
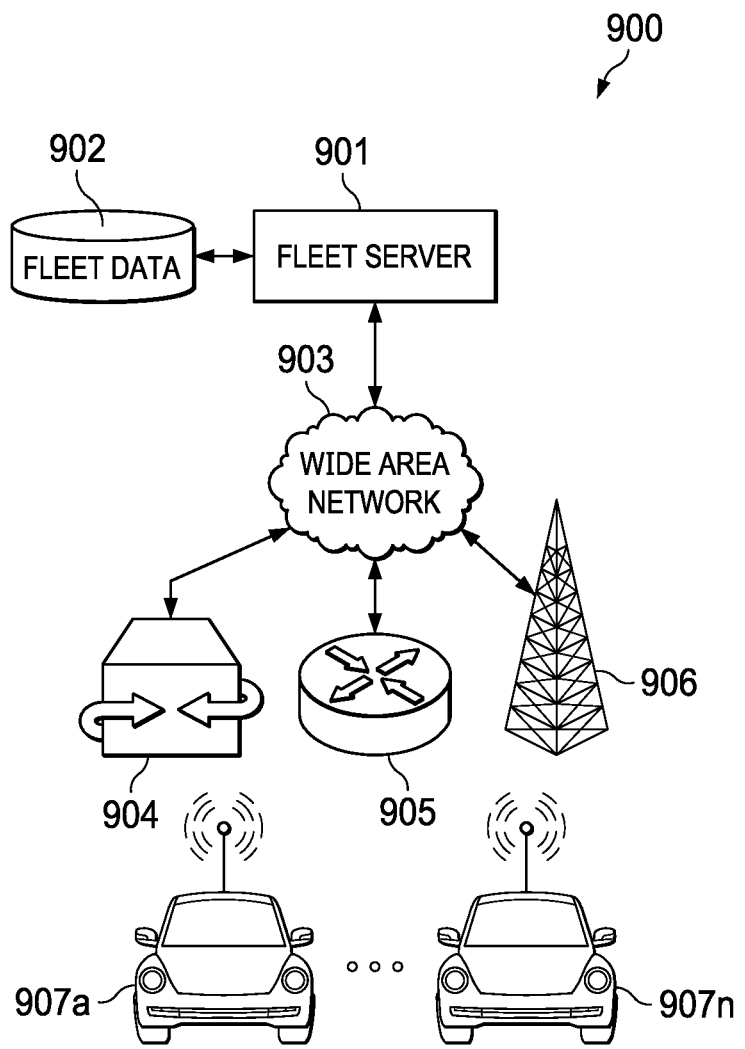
FIG. 9 illustrates a fleet management system providing localization estimations to fleet vehicles, in accordance with one or more embodiments.

FIG. 9 illustrates a fleet management system 900 to provide localization estimations to at least one fleet vehicles, e.g., 907a, 907n. The data management components of the fleet management system 900 includes a fleet server 901 and a fleet databases 902. In an embodiment, the fleet server 901 is implemented on a cloud computing environment similar to cloud computing environment 200 described below with respect to FIG. 2. In such embodiments, the fleet server 901 is implemented on a computer system similar to computer systems 206a, 206b, 206c, 206d, 206e, and 206f and the fleet database 902 is implemented on data centers similar to cloud data centers 204a, 204b, and 204c.

Components of system 900 are connected by any form or medium of digital data communication such as a communication network, e.g., wide area network 903. Further examples of communication networks include a local area network ("LAN"), peer-to-peer networks (having ad-hoc or static members), grid computing infrastructures, and the Internet. In an embodiment, the fleet server 901 and the fleet database 902 connect over a local area network and communicate with system components over wide area network 903.

FIG. 9 depicts the fleet server 901 in communication with various network components such as network links and network adapters through wide area network 903. The exemplary network components of FIG. 9 include gateway 904, router 905, and cellular tower 906 for wireless communication with vehicles participating in a fleet.

A fleet includes at least one fleet vehicle 907 and FIG. 9 depicts exemplary fleet vehicles 907*a-n*. Fleet vehicles 907*a-n* are examples of autonomous vehicles including similar architectures 400 such as AV 100 shown in FIG. 1 or AVs 501, 503*a-c* shown in FIG. 5. Fleet vehicles 907*a-n* communicate with fleet server 901 and transmit state information such as localization estimations which the fleet management system 900 stores on the networked fleet database 902.

In an embodiment, fleet vehicle 907*a* determines that external signals will be lost as the fleet vehicle 907*a* continues along trajectory 414. Fleet vehicle 907*a* sends a request to fleet management system 900 to assist in determining a set of nearby mobile beacons to assist in localization of fleet vehicle 907*a*. The request includes the localization estimation of fleet vehicle 907*a*. Fleet server 901 receives the request for localization assistance from fleet vehicle 907*a* and compares the estimated position included in the localization estimation to the database of localization estimations for fleet vehicles 907*b-n* stored on fleet database 902. The fleet server 901 selects at least one fleet vehicle 907*b-n* based on at least one criteria to assist in the localization of fleet vehicle 907*a*.

In an embodiment, the criteria includes a range to fleet vehicle 907*a*. For example, fleet server 901 selects at least one fleet vehicle 907*b-n* whose estimated position is less than 0.5 miles from the requesting fleet vehicle 907*a* (e.g., less than 0.4, less than 0.3, less than 0.2, or less than 0.1). For example, the fleet server 901 provides to the requesting fleet vehicle 907*a* a list of all fleet vehicle 907*b-n* within range for assisting in localization. In another example, the fleet server 901 provides a list of a fixed number of fleet vehicle 907*b-n* within range (e.g., two, three, four, five, or more fleet vehicles). In a further embodiment, the criteria includes estimated velocities of fleet vehicle 907*b-n*. For example, fleet server 901 selects at least one fleet vehicle 907*b-n* whose estimated velocity is zero (e.g., parked, or stationary).

Fleet server 901 transmits a command to the at least one selected fleet vehicle, e.g., fleet vehicle 907*n*, to broadcast the localization estimation stored in the localization module 408. Fleet vehicle 907*n* receives the command and responsive to the command, broadcasts a signal including the localization estimation. Requesting fleet vehicle 907*a* receives the signal and uses the included localization estimation to calculate a new estimated position and associated uncertainty.

In an embodiment, the fleet server 901 sends a command to the selected fleet vehicle to broadcast the localization data as a pseudolite.

In an embodiment, fleet vehicles 907*a-n* operate in an 'fleet lead' mode in which fleet server 901 designates one fleet vehicle, e.g., fleet vehicle 907*a*, as a beacon vehicle and the remaining fleet vehicles 907*b-n* as 'client vehicles'. Beacon vehicle 907*a* broadcasts, continuously or intermittently, a signal including the localization estimation and client vehicles 907*b-n* receive and use the localization estimation of beacon vehicle 907*a* to calculate estimated positions. In this manner, beacon vehicle 907*a* assists in the localization of client vehicles 907*b-n*, reducing the number of vehicles requesting localization assistance from fleet server 901.

Figure 10:
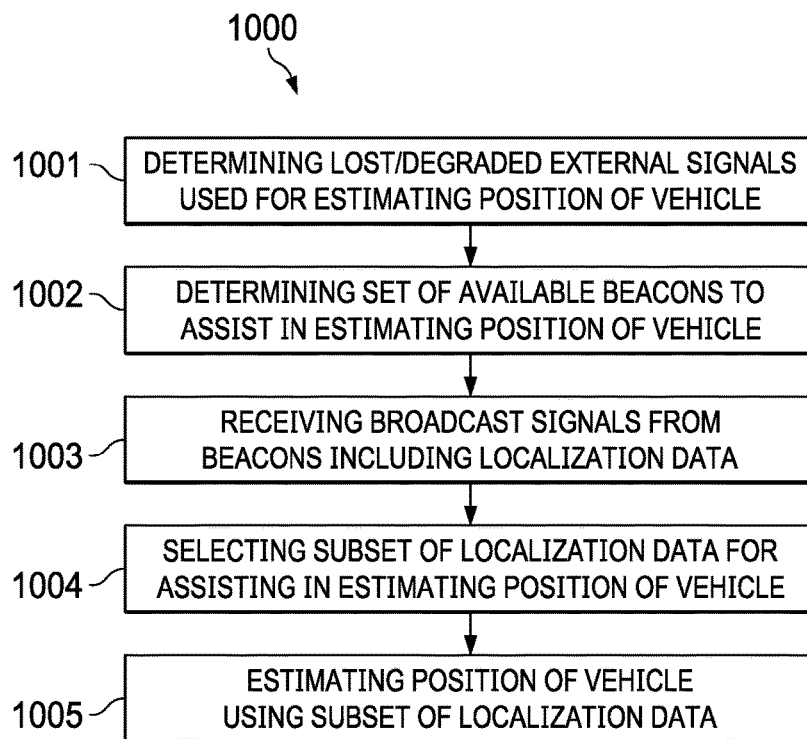
FIG. 10 is a flowchart of a process for localizing an autonomous vehicle using beacons, in accordance with one or more embodiments.

FIG. 10 is a flowchart of a process 1000 for localizing an autonomous vehicle using beacons, in accordance with one or more embodiments. Process 1000 can be implemented using, for example, computer system 300, described in reference to FIG. 3.

Process 1000 includes determining that a vehicle has lost external signals or is receiving degraded external signals that are used for estimating a position of the vehicle (1001), determining a set of mobile beacons that are available to assist in estimating the position of the vehicle in place of the external signals (1002), receiving, using a communication device of the vehicle, broadcast signals from the set of mobile beacons, the broadcast signals including localization data for each beacon in the set of mobile beacons (1003), selecting the localization data for a subset of mobile beacons for assisting in the position estimation of the vehicle (1004); and estimating the position of the vehicle using the selected localization data (1005). In an embodiment, the external signals are GNSS signals, Wi-Fi signals or cell tower signals. In an embodiment, the set of beacons includes only mobile beacons or a mix of fixed and mobile beacons. In an embodiment, the broadcast signals are sent by other vehicles using RADAR or another sensor configured for short range communication. In an embodiment, the position of the vehicle can be estimated using trilateration for fixed or parked beacons and the techniques described in Wong et al. (DOI: 10.1109/WCNC.2007.433) estimating the position of the vehicle using mobile beacons.

Figure 11:
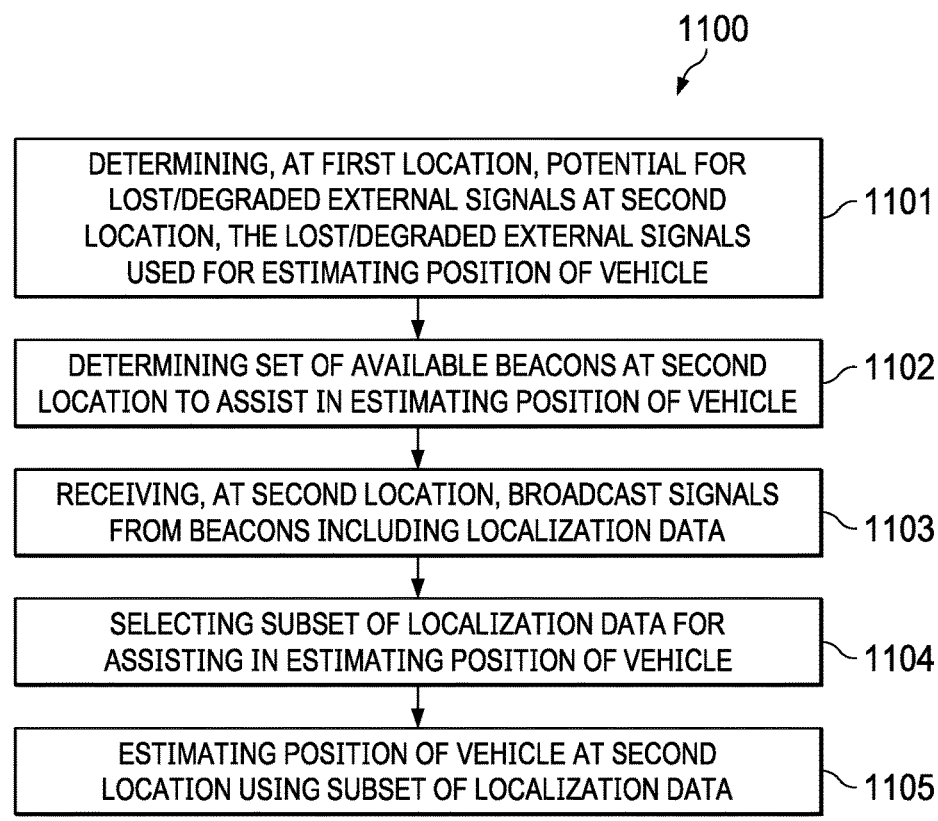
FIG. 11 a flowchart of another process for localizing an autonomous vehicle using beacons, in accordance with one or more embodiments.

FIG. 11 a flowchart of another process for localizing an autonomous vehicle using beacons, in accordance with one or more embodiments. Process 1100 can be implemented using, for example, computer system 300, described in reference to FIG. 3.

Process 1100 includes determining, at a first location, that a vehicle operating at the first location may lose external signals or receive degraded external signals at a second location, where the external signals are used for estimating the position of the vehicle (1101), determining a set of mobile beacons, at a second location, that are available to assist in estimating the position of the vehicle at the second location (1102), and, at the second location, receiving broadcast signals from the set of mobile beacons, the broadcast signals including localization data for each beacon in the set of mobile beacons (1103), selecting a subset of localization data for assisting in estimating the position of the vehicle at the second location (1104), and estimating the position of the vehicle at the second location using the localization data (1105).

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
predicting, using at least one processor of a vehicle, that the vehicle is to lose external signals that are used for estimating a position of the vehicle by:
   predicting, using the at least one processor, that the vehicle will arrive at a location at a future time based on a map and route of the vehicle; and
   predicting, using the at least one processor and based on the map and the route of the vehicle, that line-of-sights from transmitters of the external signals to the vehicle at the location and at the future time will be at least partially obstructed;
determining, using the at least one processor, a set of mobile beacons that are available to assist in estimating the position of the vehicle at the future time;
receiving, using the at least one processor, broadcast signals from the set of mobile beacons at the future time, the broadcast signals including localization data for the set of mobile beacons; and
estimating, using the at least one processor, the position of the vehicle using the localization data.

2. The method of claim 1, wherein estimating the position of the vehicle using the localization data comprises:
selecting, using the at least one processor, a subset of localization data from a subset of mobile beacons for assisting in the position estimation of the vehicle, wherein the subset of localization data comprises estimated locations of the set of mobile beacons and uncertainty values associated with the estimated locations, wherein the subset of mobile beacons is selected based at least in part on the uncertainty values.

3. The method of claim 2, wherein selecting the subset of localization data from the subset of mobile beacons, further comprises:
computing dilution of precision (DOP) values for combinations of mobile beacons in the set of mobile beacons; and
selecting, using the at least one processor, the subset of localization data from the subset of mobile beacons based at least in part on the DOP values.

4. The method of claim 1, wherein the external signals include at least one of: satellite signals, wireless network signals, or cellular network signals.

5. The method of claim 1, wherein the mobile beacons include other vehicles configured to transmit the broadcast signals.

6. The method of claim 1, wherein determining the set of mobile beacons, further comprises:
sending, to a network computer, a current position of the vehicle; and
receiving, from the network computer, the set of mobile beacons.

7. The method of claim 2, wherein the localization data includes timestamps, and selecting the subset of mobile beacons further comprises:
excluding from the subset of mobile beacons any mobile beacons that have a timestamp that exceeds a threshold value.

8. The method of claim 2, wherein the mobile beacons in the set of mobile beacons are configured to operate as pseudolites, and the broadcast signals include localization data for the subset of mobile beacons.

9. The method of claim 1, further comprising:
determining, using the at least one processor, a set of stationary beacons that are available to assist in estimating the position of the vehicle;
selecting, using the at least one processor, a mixed subset of mobile beacons and stationary beacons;
receiving, using the at least one processor, broadcast signals from the mixed subset of mobile beacons and stationary beacons, the broadcast signals including localization data for the mixed subset of mobile beacons and stationary beacons; and
estimating, using the at least one processor, the position of the vehicle using the localization data for the mixed subset of mobile beacons and stationary beacons.

10. The method of claim 1, wherein determining that the vehicle has lost external signals includes determining that the external signals are degraded.

11. A method comprising:
at a first location:
   predicting, using at least one processor of a vehicle, that the vehicle operating at the first location is to lose external signals used for estimating a position of the vehicle by:
      predicting, using the at least one processor, that the vehicle will arrive at a second location at a future time based on a map and route of the vehicle; and
      predicting, using the at least one processor and based on the map and the route of the vehicle, that line-of-sights from transmitters of the external signals to the vehicle at the second location and at the future time will be at least partially obstructed;
   determining, using the at least one processor, a set of mobile beacons, at second second location that are available to assist in estimating the position of the vehicle at the second location at the future time;
at the second location:
   receiving, using the at least one processor, broadcast signals from the set of mobile beacons at the future time, the broadcast signals including localization data of the mobile beacons; and
   estimating, using the at least one processor, the position of the vehicle at the second location using the localization data.

12. The method of claim 11, wherein estimating the position of the vehicle at the second location using the localization data comprises:
selecting, using the at least one processor, a subset of localization data from a subset of mobile beacons for assisting in the position estimation of the vehicle, wherein the subset of localization data comprises estimated locations of the set of mobile beacons and uncertainty values associated with the estimated locations, wherein the subset of mobile beacons is selected based at least in part on the uncertainty values.

13. The method of claim 12, wherein selecting the subset of localization data from the subset of mobile beacons, further comprises:
computing dilution of precision (DOP) values for combinations of mobile beacons in the set of mobile beacons; and
selecting, using the at least one processor, the subset of mobile beacons from the subset of mobile beacons based at least in part on the DOP values.

14. The method of claim 11, wherein the map includes a three-dimensional building model.

15. The method of claim 11, wherein the external signals include at least one of satellite signals, wireless network signals or cellular network signals.

16. The method of claim 11, wherein the set of mobile beacons include other vehicles configured to transmit the broadcast signals.

17. The method of claim 11, wherein determining the set of mobile beacons at the second location, further comprises:
sending, to a network computer the second location; and
receiving, from the network computer, the set of mobile beacons.

18. The method of claim 12, wherein the localization data includes timestamps, and selecting the subset of mobile beacons further comprises:
excluding from the subset of mobile beacons any mobile beacons that have a timestamp that exceeds a threshold value.

19. The method of claim 12, wherein the set of mobile beacons are configured to operate as pseudolites and the broadcast signals including localization data for the subset of mobile beacons.

20. The method of claim 11, further comprising:
determining, using the at least one processor, a set of stationary beacons at the second location that are available to assist in estimating the position of the vehicle at the second location;
selecting, using the at least one processor, a mixed subset of mobile beacons and stationary beacons for assisting in estimating the position of the vehicle;
at the second location:
receiving, using the at least one processor, broadcast signals from the mixed subset of mobile beacons and stationary beacons, the broadcast signals including localization data for the mixed subset of mobile beacons and stationary beacons; and
estimating, using the at least one processor, the vehicle at the second location using the localization data for the mixed subset of mobile beacons and stationary beacons.

* * * * *